May 11, 1954

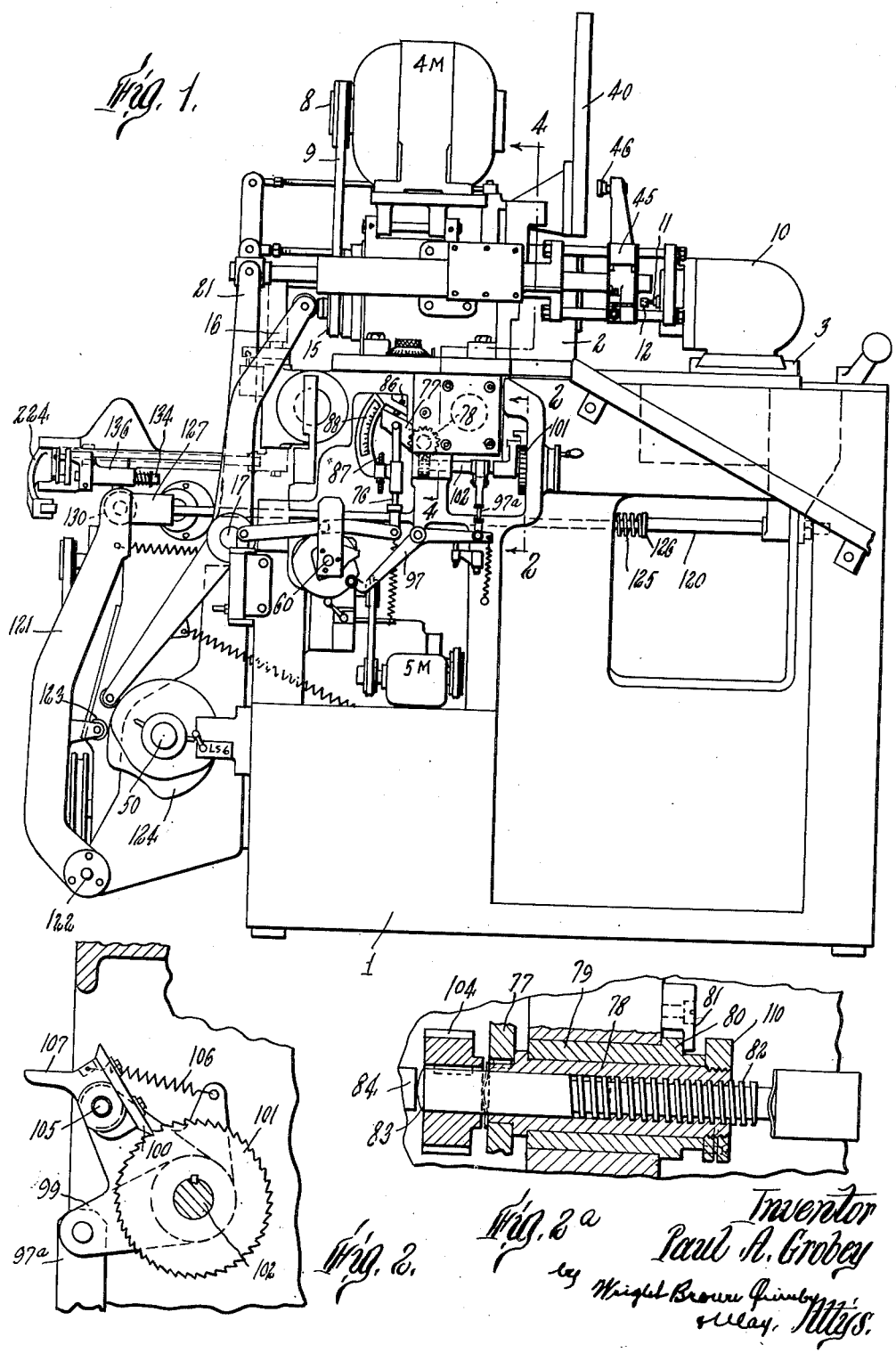

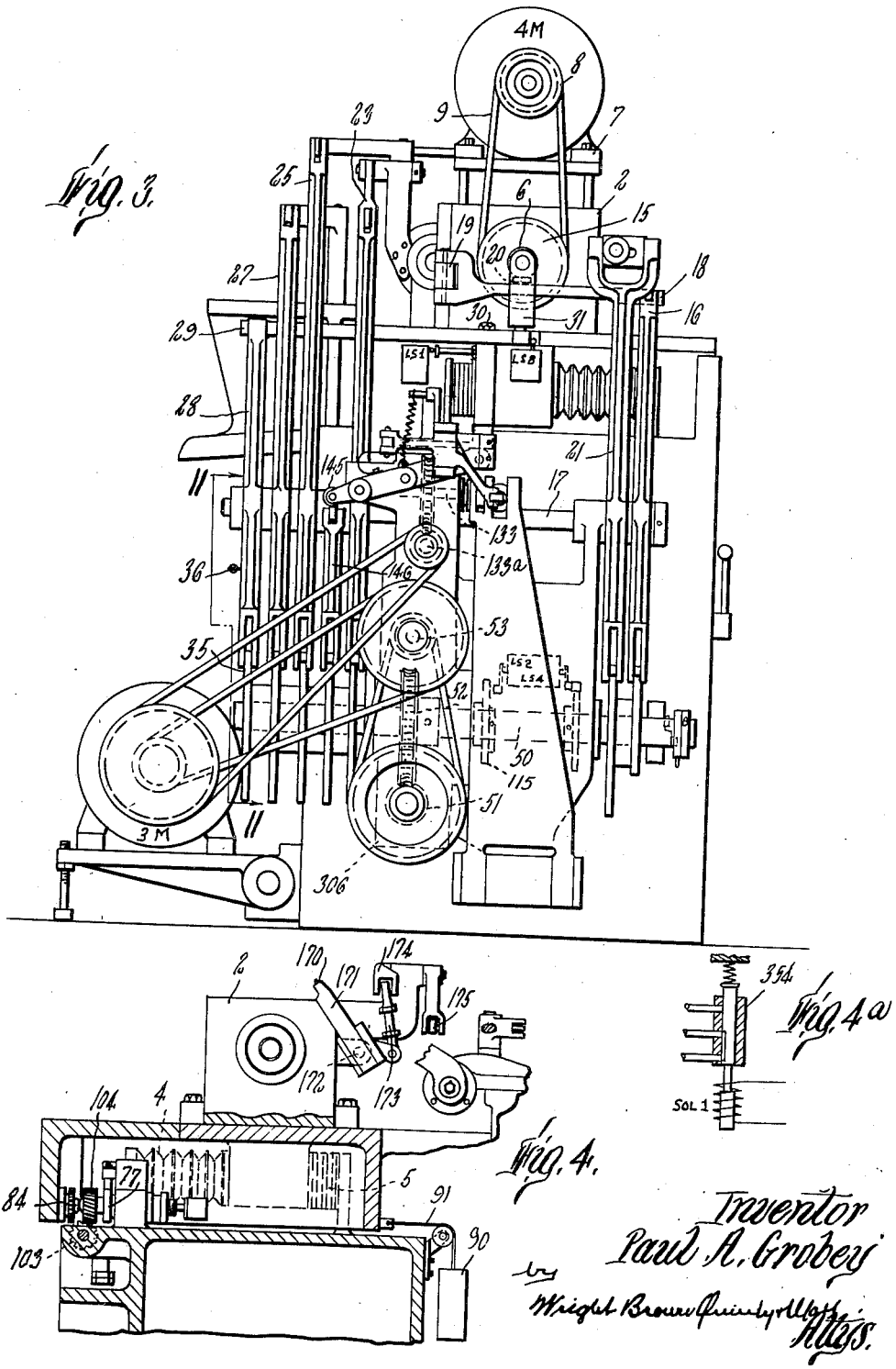

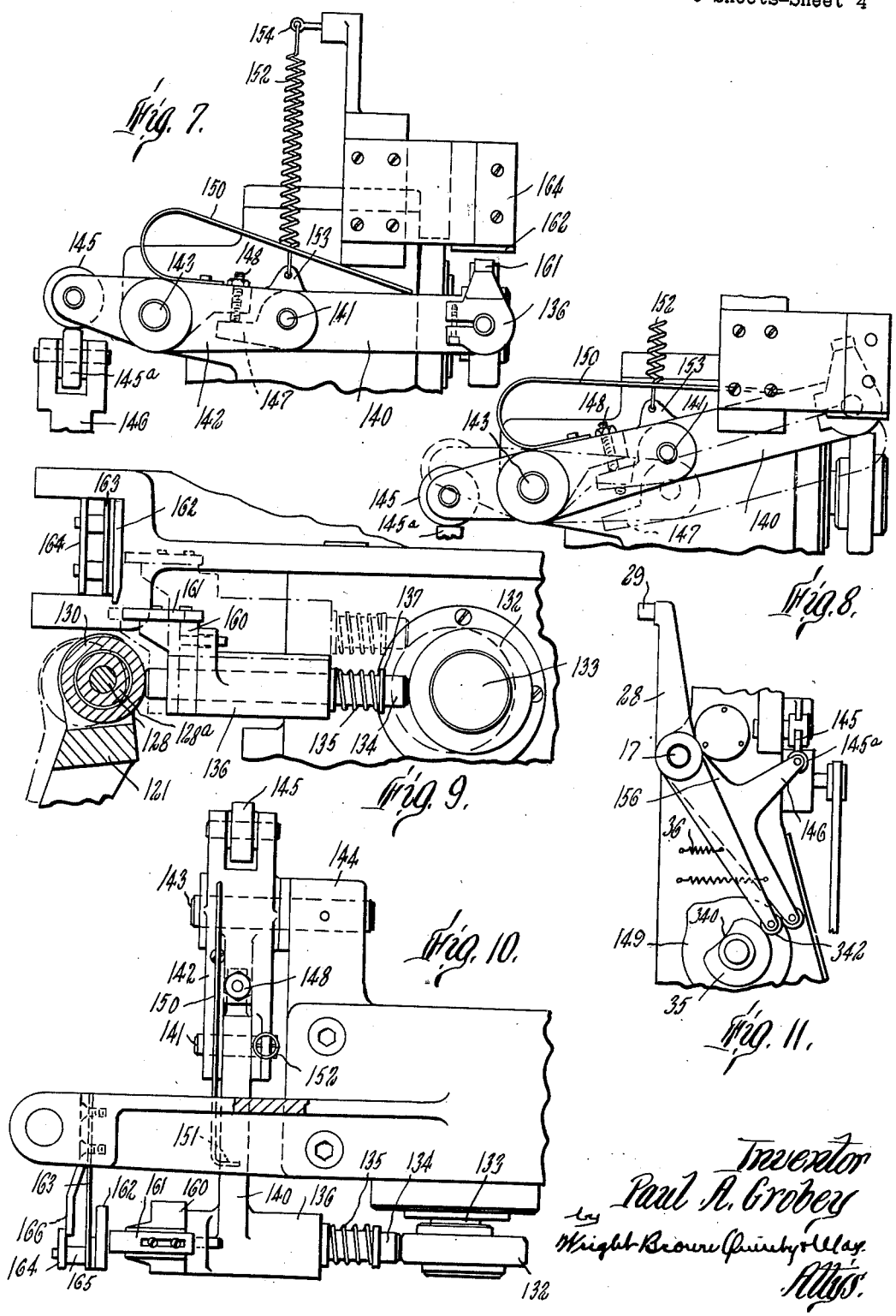

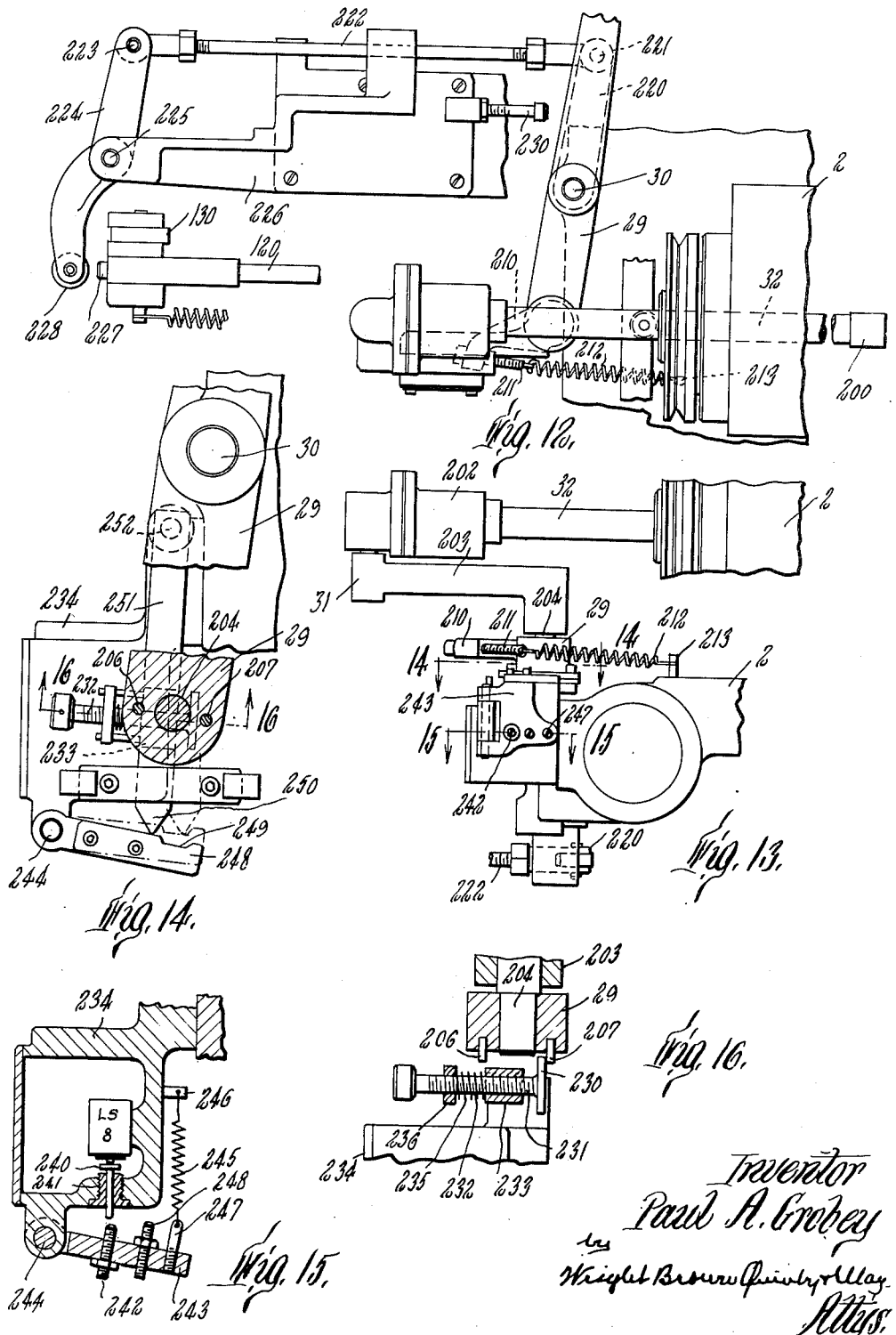

P. A. GROBEY 2,677,921

AUTOMATIC GRINDING MACHINE

Filed July 12, 1951

Inventor
Paul A. Grobey
by Wright, Brown, Quinby & May
Attys.

Patented May 11, 1954

2,677,921

UNITED STATES PATENT OFFICE 2,677,921

AUTOMATIC GRINDING MACHINE

Paul A. Grobey, Springfield, Vt., assignor to Bryant Chucking Grinder Company, Springfield, Vt., a corporation of Vermont Application July 12, 1951, Serial No. 236,297

9 Claims. (Cl. 51—50)

This invention relates to grinding machines of the type wherein the cycle of operations is controlled primarily by mechanical means, and as shown herein is exemplified in its application to internal grinding machines of the general type illustrated in my application for United States Letters Patent Serial No. 111,779 filed August 22, 1949, for Internal Grinding Machine.

In the machine shown in my application Serial No. 111,779 hereinbefore mentioned, provision is made for reciprocating the wheel axially during the grinding operation in order to produce a superior finish on the work substantially free from circumferential grinding marks.

One object of the present invention is to provide such a machine wherein increased flexibility of the cycle may be obtained. This is provided for by a control for the feed part or parts of the cycle of the machine separate from the main cam drive but initiated therefrom. The main cam drive directly controls the other portions of the cycle.

A further object of this invention is to provide a plug gage control of the final sizing of the work.

Still another object is to provide for automatic indicating and stopping of the machine at a predetermined time should the wheel become worn or dressed to a predetermined small diameter.

Further objects and advantages will appear from a description of a machine embodying the invention shown in the accompanying drawings in which Figure 1 is a front elevation of the machine.

Figure 2 is a detail sectional view to a larger scale on line 2—2 of Figure 1.

Figure 2a is a vertical sectional detail to a larger scale of parts shown in elevation on Figure 4.

Figure 3 is a left side elevation of the machine.

Figure 4 is a detail sectional view on line 4—4 of Figure 1.

Figure 4a is a detail sectional view of a solenoid and spring operated valve.

Figure 7 is a fragmentary view similar to a portion of Figure 3, but to a larger scale and showing the wheel reciprocating means in operative position.

Figure 8 is a similar view but showing the reciprocating means in full lines out of operative position similar to its position shown in Figure 3, and in dotted lines in an intermediate position approaching the operative position of Figure 7.

Figure 9 is a view of the parts shown in Figures 7 and 8 but looking from the right hand side thereof, a portion being shown in section.

Figure 10 is a top plan view of the parts shown in Figures 7 to 9, inclusive.

Figure 11 is a detail sectional view to a larger scale on line 11—11 of Figure 3.

Figure 12 is a fragmentary plan view to a larger scale showing the plug gage actuating mechanism.

Figure 13 is a fragmentary front elevation of parts shown in Figure 12.

Figure 14 is a section on line 14—14 of Figure 13.

Figure 15 is a detail sectional view on line 15—15 of Figure 13.

Figure 16 is a detail sectional view on line 16—16 of Figure 14.

Figure 5:
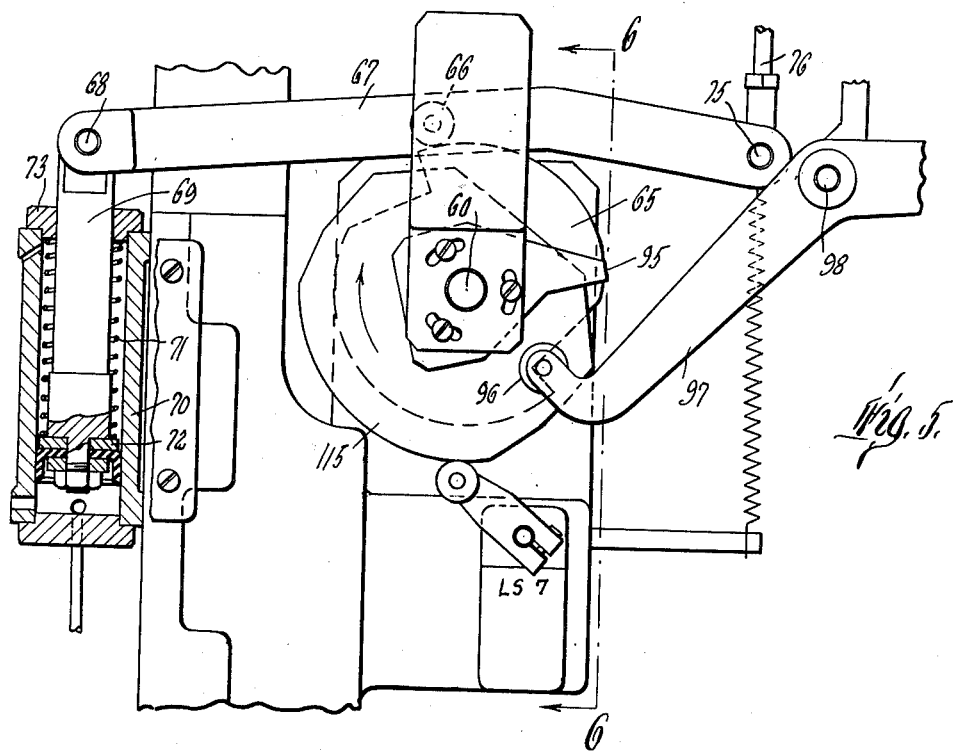
Figure 5 is a fragmentary front elevation of the machine partly broken away and in section.

As best shown in Figures 1 and 3, the machine comprises a base 1 on which is supported for linear motion a work head 2 and a wheel head 3, these motions being at right angles to each other. As best shown in Figure 4, the work head 2 is supported on suitable guides, dirt being prevented from reaching these guides by telescopic covers 4 and 5. The wheel head 3 may be similarly mounted, as shown fully in my application Serial No. 111,779 to which reference has previously been made. The work head 2 carries a rotary spindle 6 provided with any suitable chucking means for supporting a work piece and this spindle is rotated by means such as a motor 4M supported on a base 7 carried by the work head 2 and having a drive pulley 8 connected to the pulley 15 on the spindle 6 by any suitable means such as a belt 9.

The wheel head may carry a high speed motor 10 having a shaft 11 directly carrying a grinding wheel 12. Relative feed between the work piece and the grinding wheel is produced in this machine by motion of the work head 2 with respect to the base 1 toward and from the axis of the grinding wheel, and during the grinding action the wheel is arranged to be reciprocated along the work by means which will later appear.

The work piece is held by a chuck of any suitable description controlled by a cam follower arm 25 fulcrumed on a shaft 17 carried by the base 1. The upper end of this arm 25, as shown best in Figure 3, engages one end of a horizontally swingable lever 18 fulcrumed at 19 and carrying at an intermediate point a cam roller 20 which operatively engages the chuck opening means. Details of such a chuck mechanism are shown in my application Serial No. 111,779 and as it forms no part of the present invention it is not herein shown. The shaft 17 also forms a fulcrum for various other cam levers such as cam levers 21 which actuates a loading mechanism as will later appear, a lever 23 which actuates a wheel dressing device, a lever 27 which actuates a wheel truing device and a lever 28 which actuates a plug gage. The plug gage is actuated from the lever 28 which bears at its upper end against a horizontal lever 29 (see Figures 3 and 12) carried by a rock shaft 30 having an upright 31 connected at its upper end to a stem 32 arranged coaxially with the work spindle and carrying a plug gage 200 (Figure 12) of any suitable description at its inner end. Whenever the plug gage projects into the work piece on occasion of the hole therein being enlarged to finish diameter, a switch LS6 is actuated thereby for a purpose which will later appear. The cam 35 which actuates this plug gage may be so contoured that during the rough grinding the plug gage is held back from the work and during the finish grinding it is allowed to contact the work when permitted by mechanism to be described.

At 40 is illustrated a chute, the articles to be ground moving down through the chute where they are picked off one by one by a work-loading device shown at 45 and having a work-receiving plug 46 movable in and out to enter the chute 40 to receive a work piece and then to retract and turn downwardly and present the work piece into the chuck carried by the work spindle.

Figure 6:
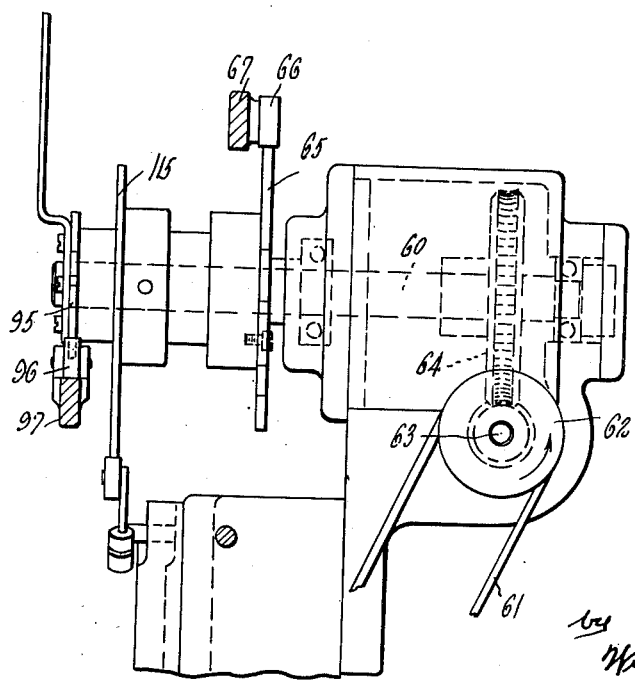
Figure 6 is a detail sectional view to a larger scale on line 6—6 of Figure 5.
Figure 17:
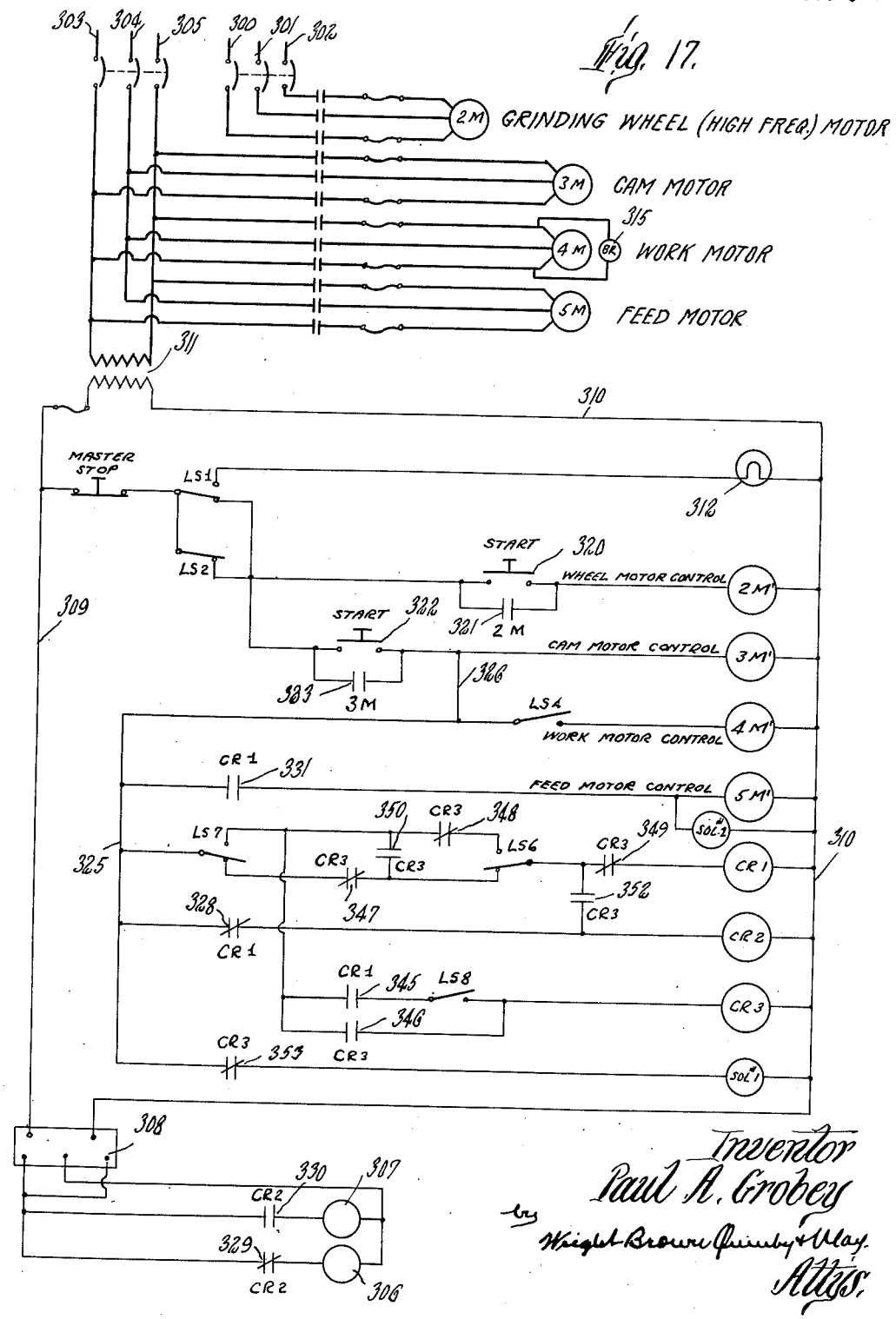
Figure 17 is a simplified wiring diagram of the controls for an automatic grinding operation.

The various levers carried by the shaft 17 are actuated by suitable cams on a cam shaft 50 which is driven intermittently through a suitable electrically closed clutch 306 shown diagrammatically in Figure 17 by a suitable motor shown at 3M, as through a worm 51 on the motor and belt-driven shaft 53 engaging a worm wheel 52 carried by the shaft 50 as shown in Figure 3. When the clutch is open a spring-applied electrically-released brake 307 (Figure 17) stops the rotation of the shaft while the motion of the motor continues. This shaft 50 controls many of the operative portions of the cycle of the machine, with the exception of the time during which the grinding wheel is operating upon the work, at which time the cam shaft 50 is stationary and the relative feed between the work piece and the grinding wheel is controlled by the rotation of a shaft 60 (Figures 1 and 6). This shaft 60 is actuated by a motor 5M, being connected as by a belt 61 from this motor to a pulley 62 (see Figure 6) and through a worm 63 and worm wheel 64 to the shaft 60. This shaft 60 carries a feed cam 65 (see Figure 5) upon which rides a follower 66 carried by a lever 67 fulcrumed at 68 on the upper end of a plunger 69 which extends into a fluid pressure cylinder 70. In a normal feed position this plunger 69 extends well into the cylinder 70 as shown in Figure 5 and being normally there held as by a spring 71 reacting between the head 72 of the plunger and the piston head 73, and the follower roll 66 rides on the feed cam 65.

The opposite end of the lever 67 is pivoted at 75 to a rod 76, the upper end of which is connected to a feed actuating arm 77 fixed to a sleeve 78 (see Figure 2a) which is mounted for rocking motion in a bearing 79 and is prevented from axial motion by nut 110. This sleeve 78 is internally threaded for a portion of its length and engages an externally threaded feed shaft 82. One end of the shaft 82 is formed rounded as at 83 and against it bears an abutment 84 which, as shown best in Figure 14, is carried by the work slide or head 2, the work head being urged toward engagement of the abutment 84 against the end of the feed screw 82 by means such as a weight 90 connected to the work head as by a cable 91. Rocking of the sleeve 78 is thus effective through its engagement with the threads of the feed screw 82 to move this screw 82 axially thus to produce a feed and retracting motion between the work and the grinding wheel by oscillation of the arm 77. As shown in Figure 1 limit screws 86 and 87 determine the limits of oscillation of the arm 77 which travels across a graduated scale 88.

Besides this feed and retractive motion produced by rocking the arm 77, means are also provided for producing a secondary feed which compensates for wear and truing of the grinding wheel. This is accomplished through a cam 95 carried by the feed shaft 60, as shown best in Figures 5 and 6, and against which bears a follower 96 journaled on an arm 97 fulcrumed at 98. The opposite end of the arm 97 is attached to the lower end of a link 97a (see Figures 1 and 2), the upper end of which is pivoted to a rocker 99 pivoted on the shaft 102 and provided with a ratchet dog 100 meshing with a ratchet wheel 101 fixed to the shaft 102. At one end the shaft 102 carries a spiral gear 103 meshing with a similar gear 104 fixed to the feed shaft 82. The ratchet dog 100 is pivoted at 105 to the rocker 99 and is normally held in engagement with the teeth of the ratchet wheel 101 as by the spring 106, but it can be lifted therefrom by the operator engaging an ear 107 on the ratchet device and rocking it about the pivot 105. The intermittent rocking of the shaft 102 by impingement of the cam 95 on the arm 97 is therefore effective to turn the feed shaft 82 a predetermined angular distance in one direction against the weight 90 to feed the work head relative to the wheel. A split nut 110 engages the threads of the sleeve 78 and butts against the sleeve 79 thus to take up any lost motion between sleeves 78 and 79.

Also carried by the feed shaft 60 is a further cam 115 (see Figure 6) which actuates at suitable times a switch LS7 which controls the starting and stopping of the feed motor. As will later more fully appear the arrangement is such that the relative feed between the grinding wheel and the work is accomplished during the rotation of the shaft 60 and while the cam shaft 50 is stationary. During rough grinding the feed is controlled by the first portion of the feed cam and when the feed has progressed during finish grinding to the point where the plug gage shows that the work has been ground to finished size, the grinding cycle is stopped.

The feed motor 5M is provided with a brake which is applied by a spring as soon as the feed motor is deenergized and is released by the action of a solenoid #2 (Figure 17) when the feed motor is energized.

Wheel oscillation during grinding

During the grinding operation and while the work is being fed to the grinding wheel by the feed mechanism previously described, the grinding wheel is given an oscillatory motion, and the mechanism for accomplishing this is shown in Figures 1 and 7 to 11, inclusive. The wheel head 10, as shown in Figure 1, has connected to its lower end a rod 120 the other end of which is connected to the upper end of an arm 121 fulcrumed at its lower end at 122 and having a cam follower roll 123 which bears against a cam 124. A spring 125 (Figure 1) surrounding the rod 120 and reacting between a portion 126 of the head and a fixed abutment tends to hold the cam follower 123 against its cam 124 and to hold the wheel head 10 spaced from the work as far as is permitted by the contour of the cam 124. The lever 121 carries a pin 128 provided with a disk 128a on which is journaled a ring 130. At suitable times a spacer bar 134 may be lowered into position between an eccentric 132 and the ring 130, as shown in Figure 9, whereupon the eccentric 132 is effective to press the bar 134 against the ring 130 which causes the head 12 to oscillate thus to produce a corresponding oscillation of the grinding wheel 12 with respect to the work. The eccentric 132 is carried by a shaft 133 rotated through a driving train continuously by the motor 3M. As shown in Figure 3, the driving train comprises a belt drive from the motor 3M to a worm shaft 133a driving a worm gear on the shaft 133. The bar 134 is normally pressed away from the ring 130 as by a coil spring 135 bearing between its mounting sleeve 136 and a collar portion 137 thereon. The sleeve 136, as shown best in Figures 7, 8, 9 and 10, is carried by an arm 140 pivoted at 141 to a second arm 142 fulcrumed at 143 on a stationary bracket 144. The arm 142 is provided with a cam roller 145 at its outer end against which may ride a roller 145a carried by an arm 146 so that as the arm 146 is lifted this roller 145 is lifted from the full line position shown in Figure 8 to the dotted line position shown in that figure. This tends to bring the bar 134 between the eccentric 132 and the ring 130, but should the eccentric 132 be so angularly positioned at the time that this cannot readily be done, the arm 140 is allowed to turn about its pivot 141 into the dotted line position shown in Figure 8, allowing a tail portion 147 of the arm 140 to move away from an abutment screw 148 which is carried by the arm 142, against the action of a wire spring 150 secured at one end to the arm 140 and looped and with its opposite laterally turned end 151 bearing against the arm 140. As soon as the eccentric 132 moves away from the bar 134 sufficiently for the bar to pass freely between it and the roll 130, this spring 150 straightens out the toggle arms 140 and 142 into the positions shown in Figure 7. The up and down motion of the cam roller 145a is produced by its actuating cam 149, the cam roller 145 being arranged on an arm 146 (see Figure 11) projecting laterally from the cam lever 156 which is fulcrumed on the shaft 17. On removal of the cam roller 145a from beneath the roller 145, a coil spring 152 having its lower end engaged in a loop 153 on the arm 142 and its upper end anchored at 154 lifts the bar 134 out from operative position and stops further oscillation of the grinding wheel.

The bar 134 also carries a bracket 160 at its rear end to the upper face of which is adjustably secured by screw and slot connections, an abutment 161. This abutment 161 cooperates with a latch plate 162 which is carried by a leaf spring 163 and which is normally held by this spring 163 in the position shown in Figures 9 and 10 so that should the bar 135 be in its left hand position shown in dotted lines in Figure 9, being so positioned by the engagement of a corresponding portion of the eccentric 132 thereon, the arm 140 cannot be lifted by the spring 152 until such time as the eccentric turns to a position allowing the spring 135 to move the bar 134 to the right as viewed in Figure 9 until it clears the right hand lower corner of the latch member 162, whereupon it may be lifted to its upper position shown in dot and dash lines in Figure 9. Should the eccentric 132 be effective to move the bar 134 against the pressure of the coil spring 135 as the bar is being lowered before it clears the latch plate 162, this latch plate will yield through the leaf spring 163. Thus the mechanism carried by the arm 140 may be moved between its two positions without shock which could be imparted to the grinding wheel. As shown best in Figure 10, the latch member or plate 162 is prevented from springing forwardly beyond its desired position by a stop plate 164 spaced therefrom by a spacer 165 and which extends back or to the left of an abutment plate 166.

This mechanism for reciprocating the grinding wheel is not claimed herein as it forms subject matter of my application Serial No. 230,349 filed June 7, 1951, for Grinding Wheel Reciprocating Mechanism.

The wheel truing device

The wheel truing device 170 shown in Figure 4 is carried by an arm 171 pivoted at 172 to the work head 2 and connected through a link 173 to one arm of a rocker 174, the other arm of which is connected through a link 175 to the upper end of its actuating lever 23. Its actuating cam is so contoured that the truing device is swung down at the end of the rough grinding so that the wheel is caused to traverse it during its retraction by the action of the cam 124 and just after the feed compensation for wheel wear and truing has been effected.

Plug gage mechanism

The final termination of the grinding cycle is produced by the action of a plug gage which is shown best in Figures 3 and 12 to 16, inclusive. The plug gage is shown at 200 in Figure 12 and is carried by a stem 32 which extends coaxially through the work spindle, and at suitable times during the finish grinding it is moved toward the work so that when the hole in the work has been ground to finished size it enters therein and actuates mechanism completing the grinding cycle. The rear end of the stem 32 is secured in a head 202 which is connetced to a link 203 having a down-turned forward end which pivotally engages at 204 in one end of the lever 29. The lower face of the lever 29 carries a pair of abutment pins 206 and 207 diametrically disposed to the pivot 204. The lever 29 also carries a hooked extension 210 through the end of which is passed an adjusting eye bolt 211, and a spring 212 engages the eye of this bolt at one end and is hooked over a pin 213 in a portion of the work head at the other end. This spring 212 tends to pull the stem 32 and the plug gage toward the work. Also secured to the rock shaft 30 to rock with the arm 29 and beneath it is an arm 220 to the outer end of which is pivoted, as at 221, a link 222, the opposite end of which is pivoted at 223 to a lever 224 fulcrumed at 225 on a fixed bracket member 226. The other end of the lever 224 extends into alinement with an extension 227 of the rod 120, a roll 228 journaled at the end of the arm 224 being positioned to be contacted by this extension 227 at certain times. An adjustable threaded stop 229 secured in the bracket 226 limits the extent of outward rocking motion of the arm 220, thus to limit the inward rocking motion of the roll 228 toward extension 227.

It will be recalled that when the bar 134 is interposed between the eccentric 132 and the ring 130, the rod 120, which is connected to the wheel head, is reciprocated, thus causing the wheel to reciprocate within the work. It is important that when the wheel is moved in its reciprocation toward the gage plug that this gage plug should be retracted in order to prevent contact between the two, but when the wheel is at its opposite limit of reciprocating motion, the plug gage during the finish grinding portion of the cycle should be permitted motion toward the work so that when the work is ground to finished size it may enter therein and stop the grinding cycle. The motion to the left, as viewed in Figure 12, of the rod 129, which would bring the grinding wheel into the work, therefore, is made to contact the roll 228, and retract the gage plug therefrom. As will later more fully appear, during loading, and, if desired, also, during rough grinding the arm 29 and the rod 32 are held by the controlling cam sufficiently far to the left so that the plug gage is held out of contact with the work.

When the plug gage enters the work, showing that the work is of finished size, the switch LS8 (Figures 15 and 17) is actuated. This is accomplished by the mechanism shown best in Figures 14 to 16. The pins 206 and 207 which extend downwardly from the arm 29 are positioned on opposite sides of the head 230 of a member 231 having a threaded shank 232 carried by a sleeve 233. A spring 235 surrounding the shank of the member 231 and bearing between one end face of the sleeve 233 and a nut 236 carried by this shank acts to take up any lost motion between the threads of the sleeve and of the shank, thus providing for accurate adjustment of the position of the head 230. A box-shaped member 234 carried by the work head carries therein the switch LS8, as shown best in Figure 15, and it is actuated to closed position by impingement thereon of an actuating stem 240 slidably mounted through a sleeve 241 threaded into the outer face of the member 234 and adapted to be contacted at suitable times by an adjustable abutment screw 242 carried by an arm 243 pivoted at 244 to the member 234. It is normally pulled inwardly as by a spring 245 fixed at its inner end to a pin 246 carried by the member 234, and at its outer end to an anchor member 247 threaded into the arm 243. An adjustable stop screw 248a limits the inward motion of the arm 243.

Secured to the edge face of the arm 243 is a cam plate 248 (Figure 14) which is provided with a depression 249 in its inner face into which may ride at suitable times the pointed end 250 of an arm 251 pivoted at 252 to the box member 234. The sleeve 233 is carried by the arm 251. As the arm 29 is rocked on its pivot 30, one or the other of the pins 206 and 207, after a definite extent of lost motion, contacts the head 231 and causes swinging of the arm 251. When the pointed end 250 of this arm is in engagement with the cam plate 248 at the left hand side of the depression 249 as shown in Figure 14, the arm 243 is out of engagement with the closing mechanism for the switch LS8, but when the pin 206 engages the head 230 and moves the arm 251 to the dotted line position shown in Figure 14, the arm 243 is permitted to be moved by the spring 245, closing the switch LS8. This motion occurs only when the plug gage has moved to the right, as viewed in Figures 12 and 13, sufficiently to enter the work, when the work has been ground to finished size, and when this occurs the switch LS8 is closed, which, as will be explained later, stops the grinding cycle.

*Wiring diagram and operation*

In Figure 17 a simplified wiring diagram is given which illustrates a cycle of operations which may be carried out by the machine. The grinding wheel is actuated by a high frequency motor 2M which derives its power from the high frequency three phase lines 300, 301 and 302 by a suitable control mechanism shown at 2M in the lower portion of this figure. The cam motor 3M derives its power from the commercial frequency lines 303, 304, 305 and is arranged to be rotating continuously while the machine is in operation. It is connected to the cam shaft 50 through a clutch 306 and when the clutch is open the shaft rotation is stopped by a brake 307. The clutch and brake are both operated by direct current derived from a rectifier at 308 receiving its power from leads 309 and 310 of the secondary of a transformer 311 which is arranged across two of the lines of the three cycle power, such, for example, as the lines 303 and 305. The various control mechanisms for the four motors also derive their power from the same transformer secondary. The work motor is shown at 4M in the upper portion of the figure, being stopped by the brake 315 when the motor 4M is de-energized, the motor controls being indicated at 4M' across the secondary lines 309 and 310. This is a well known type of brake, spring actuated to apply, and electrically released as soon as the work motor is energized. The feed motor 5M which operates the feed shaft 60 has the corresponding control 5M' in the secondary circuit.

Assuming the switches LS1 and LS2 in the positions shown, the wheel motor can be started by depressing the start button 320. This closes a switch 321 actuated by the wheel motor control 2M' in a holding circuit for the start button 320 so long as one or the other of the switches LS1 or LS2 is in the position shown. Switch LS2 is opened at the end of rough grinding by a cam 313 on the cam shaft 50 shown in Figure 3. LS1 is moved over to the other position when the work slide moves to a predetermined extreme feed position and causes a worn wheel lamp 312 to be lighted. If this happens when the switch LS2 is open it interrupts the circuit to all of the motors and shuts down the machine. The worn wheel should then be replaced by a new or larger diameter wheel.

The cam motor is started by depressing the start button 322 which starts the cam motor control 3M' and energizes a holding circuit for motor 3M by closing the switch 323 actuated by the 3M' control. As before noted, the energization of the cam motor control does not start the cam shaft rotating unless the brake 307 has been released and the clutch 306 closed. The brake is thrown out and the clutch thrown in, however, by energization of the relay CR2 through the closed switch CR1 at 328 in its circuit between the lead 310 and the lead 325, which connects through the lead 326 to the cam motor control 3M' beyond the start switch 322. The cams are now effective to start the operation of the loading mechanism and other parts, and on closing the switch LS4 by the rotation of the cam shaft 50 to a predetermined position the work motor 4M starts to rotate the work. The cam shaft continues to turn until an actuating element thereon throws the switch LS6 (Figures 1 and 17) to its upper position shown in Figure 17. This deenergizes relay CR1 and consequently opens a CR1 switch at 328 which deenergizes the relay CR2, which throws out the clutch 306 by opening the CR2 switch at 329 and applies the brake by closing the CR2 switch at 330. This stops the rotation of the cam shaft. Deenergization of the relay CR1 also closes a CR1 switch at 331 which energizes the feed motor control 5M' starting the feed motor 5M and also energizes solenoid 2 between the leads 325 and 310. Energization of solenoid 2 releases the feed motor brake so that the feed motor starts to rotate and rotates the feed shaft 60. This starts the rough grinding operation, the feed cam on the shaft 60 lifting the feed arm 77 (Figure 1) and producing the feed of the wheel relative to the work. This takes place until the feed has progressed to the desired point, whereupon the feed lever 77 drops back to starting position and a cam 95 on the feed shaft 60 actuates the feed compensation arm 97 to feed the work head with the dressing device to compensate for wheel wear and truing. Then a cam 115 on the feed shaft actuates the switch LS7 away from the position shown in Figure 17, making the circuit through the relay CR1, causing this relay to be energized, opening the CR1 switch at 331 and stopping the feed motor through deenergization of the motor control 5M' and the application of the brake through deenergization of solenoid 2. Also the CR1 switch 328 is closed which energizes the relay CR2. Energization of this relay CR2 removes the brake 307 and closes the clutch 306 through the CR2 switches at 330 and 329, respectively. The cam shaft now starts to operate and through the cams thereon the wheel is retracted from the work and then returned and the truing mechanism is brought down by its cam into position to true the wheel as it is moved past it. The cam shaft now stops with the switch LS6 in its lower position and the feed shaft is started to rotate. When this has taken place, the low point 340 of the gage cam 35 (see Figure 11) is opposite to the cam roll 342 of the lever 28 allowing this lever to be moved inwardly by the spring 36 sufficiently to bring the plug gage into operative position, and this plug gage is periodically retracted as the grinding wheel is pushed into the work. This operation proceeds until such time as the hole in the work has been ground to the desired size, whereupon the plug may enter the work and close the switch LS8. Closing of the switch LS8 energizes the relay CR3. The CR1 switch at 345 now being closed, this closes the CR3 switch at 346, establishing a holding circuit around the switch LS8. Energization of the relay CR3 opens two CR3 switches at 347 and 348 and closes a switch CR3 at 350. Energization of the relay CR3 also closes a CR3 switch at 352 which energizes the relay CR2 through LS7, CR3 switch 350, LS6 and CR3 switch 352. Energization of the relay CR2 throws in the cam shaft clutch at 306 and releases the brake 307 as previously described, thus starting the cam shaft for the loading cycle. Energization of the relay CR3 also opens the CR3 switch at 353 which deenergizes the solenoid 1. Deenergization of the solenoid 1 acts to move the valve 354 in a manner to permit fluid pressure to enter the cylinder 70 and lift the fulcrum 68, throwing out the feed and allowing the feed lever 77 to drop back to starting position rocking about its engagement through the follower 66 on its cam 65. Thus the grinding action is terminated by the entrance of the plug gage into the work. The rotation of the feed shaft continues until it actuates the switch LS7 to starting position, whereupon the relay CR3 is deenergized and the parts resume positions for the start of a new cycle. It will be noted that the cam shaft 50 and the feed shaft 60 each make one complete rotation during a complete machine cycle, each of these shafts making only a partial rotation at each actuation.

From the foregoing description of an embodiment of the invention it will be evident to those skilled in the art that various changes and modifications may be made without departing from its spirit or scope.

I claim:

1. An internal grinding machine having a work head and a wheel head, a rotary spindle for supporting hollow work carried by said work head, a rotary grinding wheel carried by said wheel head, a reciprocating member, means for interposing an element between said member and said wheel head causing said member to reciprocate said wheel head relative to said work head and cause traverse of work carried by said spindle by said grinding wheel, a plug gage mounted for motion axially of the work, a spring for pressing said gage into contact with the work while the hole in the work is too small for the gage to enter therein and into the hole in the work when it has been ground to predetermined diameter, and means for causing said reciprocating means to also cause said gage to be reciprocated in time with the reciprocation of said wheel head to thereby avoid contact between said gage and the wheel.

2. In a grinding machine, means for supporting work for rotation, means supporting a grinding wheel for rotation, means operatively connected thereto for relatively moving said two supporting means from and toward each other, feeding means operatively connected thereto for relatively feeding and retracting said supporting means, means controlled by said relative moving means for actuating feeding operation of said feeding means and for then stopping itself, and means actuated by said feeding means at the completion of a predetermined feed to restore operation of said relatively moving means and then to stop itself.

3. In a grinding machine, a work feed mechanism, a rotary spindle to which said feed mechanism feeds work, means connected thereto for rotating said spindle, feed mechanism for relative feeding of said spindle and wheel, a motor operatively connected thereto for actuating said feed mechanism, a grinding wheel, a motor connected thereto for rotating said grinding wheel, a wheel dressing device adapted to dress said wheel, a cam shaft, cams on said shaft, connections from one of said cams for relatively moving said spindle and wheel from and toward operative relation for said wheel to grind work carried by said spindle, connections from another of said cams for actuating said work feed mechanism to feed work to said spindle, connections from another of said cams for actuating said dressing mechanism to dress said grinding wheel, a motor operatively connected thereto for actuating said cam shaft, mechanism for actuation by said cam shaft when said grinding wheel and spindle are in operative relation for starting said wheel feed motor to start grinding feed and to stop the rotation of said cam shaft, and mechanism for actuation by said feed mechanism at the completion of the desired extent of feeding action for stopping said feed mechanism and restarting the rotation of said cam shaft.

4. In a grinding machine, a work holder, a grinding wheel head, a cam shaft, a feed shaft, a cam on said cam shaft operative to load work pieces into said work holder, a wheel truing mechanism, cams on said cam shaft for actuating said truing mechanism to true the wheel, connections from said feed shaft to said holders for moving said holders relatively to feed the wheel into the work, connections from said feed shaft to said holders for producing an additional feed to compensate for wheel wear and truing, means for actuation by rotation of said cam shaft after said feed means has fed an article to be ground to said work holder to clamp the work piece in said holder and thereafter to stop its own rotation and start the rotation of said feed shaft, a plug sizing gage, means for actuation after a predetermined extent of rotation of said feed shaft for actuating said feed a further extent to compensate for wheel wear and truing and then to stop its own rotation and to start further rotation of said cam shaft, said truing mechanism being then in position to true said wheel by actuation of said cam shaft, means actuated by such further rotation of said cam shaft for starting rotation of said feed shaft and stopping its own rotation with said plug gage in operative position, and means for operation by the entry of the plug gage into the work for stopping the feed and returning said feed mechanism to starting position, and for then starting the rotation of said cam shaft and stopping its own rotation for a new cycle of operation.

5. In combination, a work head, a grinding wheel head, a grinding wheel on said wheel head, means including a rotary actuating shaft for relatively moving said heads lengthwise of the axis of said grinding wheel to alternately present and withdraw said wheel with respect to a work piece carried by said work head, a rotary feed shaft for moving said heads relatively transverse to said axis to feed and retract said wheel with respect to the work piece, means actuated by rotation of said actuating shaft for stopping its own rotation when said grinding wheel is in presented relation and for starting the rotation of said feed shaft from wheel retracted position to effect grinding of the work piece, means for retracting the wheel from the work piece, and means for actuating by the rotation of said feed shaft by a predetermined amount to stop further rotation of itself and to permit said retracting means to retract the wheel and for restarting rotation of said actuating shaft to withdraw the wheel from the work, and means actuated by said further rotation of said actuating shaft to stop its own rotation.

6. In combination, a work head, a grinding wheel head, a grinding wheel on said wheel head, a wheel truing device, a rotary actuating shaft for relatively moving said heads lengthwise of the axis of said wheel to alternately present and withdraw said wheel with respect to a work piece on said work head, a rotary feed shaft for moving said heads relatively transverse to said axis to feed the wheel toward the work, means tending to retract the wheel from the work, means for actuation by rotation of said actuating shaft to stop its own rotation when said grinding wheel is in presented relation and to start the rotation of said feed shaft from wheel retracted position to effect grinding of the work piece, means controlled by the rotation of said feed shaft by a predetermined amount for stopping its own rotation and for permitting said tending means to retract the wheel from the work piece, for moving said dressing device into operative position, and for restarting rotation of said actuating shaft to withdraw said grinding wheel and cause it to traverse said wheel truing device, and for then returning said wheel to presented position and stopping its own further rotation, and for restarting said feed shaft to feed the wheel against the work piece to a predetermined extent, means for actuation by said feed shaft after a predetermined extent of feed to stop its own rotation and permit said wheel to be retracted by its retracting means and for restarting said actuating shaft to withdraw said wheel, and means for actuation by said actuating shaft to thereafter stop its own rotation.

7. In combination, a work head, a grinding wheel head, a grinding wheel on said grinding wheel head, a rotary work-piece holder on said work head, a plug gage, means biasing said gage toward a hollow work piece on said work head to enter said work piece when the hole therein is of sufficient size, a rotary actuating shaft for relatively moving said heads lengthwise of the axis of said wheel to alternately present and withdraw said wheel with respect to the hole in said work piece, a rotary feed shaft for moving said heads relatively transverse to said axis to feed the wheel against the side of the hole in the work, means tending to retract said wheel from the work, means for actuation by rotation of said actuating shaft to stop its own rotation when said grinding wheel is in presenting relation, for starting the rotation of said feed shaft, for permitting said gage to move into gaging position, and for reciprocating said wheel and gage during such feed, and means for actuation by the entrance of said gage into the work to stop the rotation of said feed shaft and for restarting the rotation of said actuating shaft to withdraw the grinding wheel and gage from the work piece.

8. In combination, a work head, a grinding wheel head, a grinding wheel on said grinding wheel head, a chuck on said work head, chuck opening and closing means, feeding mechanism for feeding work pieces successively to said chuck when said chuck is open, a rotary actuating shaft for relatively moving said heads lengthwise of the axis of said chuck to present or retract said wheel with respect to a work piece carried by said chuck, for opening and closing the chuck, and for actuating said feeding mechanism, a rotary feed shaft for moving said heads laterally of said axis to feed said wheel against a work piece carried by said chuck, means for actuation by rotation of said actuating shaft to stop its own rotation when said grinding wheel is in presented position and for starting the rotation of said feed shaft to feed said wheel against the work piece and to retract therefrom after a predetermined extent of such feed, means for actuation by the rotation of said feed shaft at the completion of such grinding to stop the rotation of said feed shaft and for restarting the rotation of said actuating shaft to cause removal of said wheel from presented position, and for opening said chuck to free the ground work piece, and means for actuating by rotation of said actuating shaft for stopping the rotation of said actuating shaft.

9. In combination, a work head, a wheel head, a rotary chuck on said work head, a grinding wheel of said wheel head, means for feeding work pieces to said chuck, a wheel dressing device, means tending to move said dressing device into position to dress the wheel, a plug gage, means tending to move said plug gage to gaging position, a rotary actuating shaft, mechanisms arranged for actuation by rotation of said actuating shaft for opening and closing said chuck, for actuating said feeding means, for moving said dressing device and plug gage into inoperative positions at suitable times in the machine cycle, and for moving said heads relatively parallel to the axis of rotation of said chuck, and a feed shaft for moving said heads relatively laterally of said axis to feed and retract said wheel relative to a work piece carried by said chuck, for starting the rotation of said actuating shaft, and for stopping its own rotation, said actuating shaft also having means for starting rotation of said feed shaft and for stopping its own rotation.

References Cited in the file of this patent

UNITED STATES PATENTS

| Number | Name | Date |
|---|---|---|
| 1,497,574 | McDonough | June 10, 1924 |
| 1,612,773 | Turner | Dec. 28, 1926 |
| 1,665,160 | Einstein | Apr. 3, 1928 |
| 1,778,675 | Kempton | Oct. 14, 1930 |
| 1,826,178 | Kempton | Oct. 6, 1931 |
| 1,901,236 | Guild | Mar. 14, 1933 |
| 1,929,966 | Blood | Oct. 10, 1933 |
| 2,141,853 | Brown | Dec. 27, 1938 |
| 2,144,043 | Asbridge | Jan. 17, 1939 |
| 2,245,894 | Arms | June 17, 1941 |
| 2,251,607 | Astrowski | Aug. 5, 1941 |
| 2,352,183 | Bullard | June 27, 1944 |

FOREIGN PATENTS

| Number | Country | Date |
|---|---|---|
| 417,142 | Great Britain | Sept. 28, 1934 |